(12) United States Patent
Song et al.

(10) Patent No.: US 9,284,469 B2
(45) Date of Patent: Mar. 15, 2016

(54) FILM-FORMING HYDROPHILIC POLYMERS FOR TRANSFIX PRINTING PROCESS

(71) Applicant: Xerox Corporation, Norwalk, CT (US)

(72) Inventors: Guiqin Song, Milton (CA); Gordon Sisler, St. Catharines (CA); Suxia Yang, Mississauga (CA); Qi Zhang, Milton (CA); Brynn Dooley, Toronto (CA); James D. Mayo, Mississauga (CA); Gabriel Iftime, Cupertino, CA (US); Chu-Heng Liu, Penfield, NY (US); Biby Esther Abraham, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/266,484

(22) Filed: Apr. 30, 2014

(65) Prior Publication Data
US 2015/0315409 A1 Nov. 5, 2015

(51) Int. Cl.
*B41J 2/01* (2006.01)
*C09D 139/06* (2006.01)
*C09D 171/02* (2006.01)
*C09D 101/28* (2006.01)
*B41J 2/005* (2006.01)
*C08K 5/053* (2006.01)
*B41J 11/00* (2006.01)
*B41J 2/21* (2006.01)

(52) U.S. Cl.
CPC ............. *C09D 139/06* (2013.01); *B41J 2/0057* (2013.01); *C09D 101/28* (2013.01); *C09D 101/284* (2013.01); *C09D 171/02* (2013.01); *B41J 2/01* (2013.01); *B41J 2/2114* (2013.01); *B41J 11/0015* (2013.01); *B41J 2002/012* (2013.01); *C08K 5/053* (2013.01)

(58) Field of Classification Search
None
See application file for complete search history.

(56) References Cited

U.S. PATENT DOCUMENTS

2015/0022602 A1\* 1/2015 Landa et al. ............ B41J 11/002
347/102

OTHER PUBLICATIONS

DOW, DOW Surfactants, http://www.dow.com/surfactants/products/second.htm, retrieved Mar. 10, 2014, pp. 1-2.
DOW, Material Safety Data Sheet, Tergitol(TM) TMN-6 (90% AQ), The Dow Chemical Company, Feb. 12, 2003, pp. 1-15.

\* cited by examiner

*Primary Examiner* — Lisa M Solomon
(74) *Attorney, Agent, or Firm* — MH2 Technology Law Group LLP

(57) ABSTRACT

Provided is a coating composition for an image transfer member in an aqueous ink imaging system. The coating composition can include at least one hydrophilic polymer, at least one hygroscopic plasticizer, at least one surfactant, and water.

9 Claims, 7 Drawing Sheets

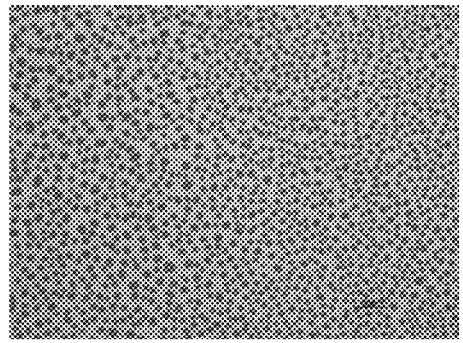
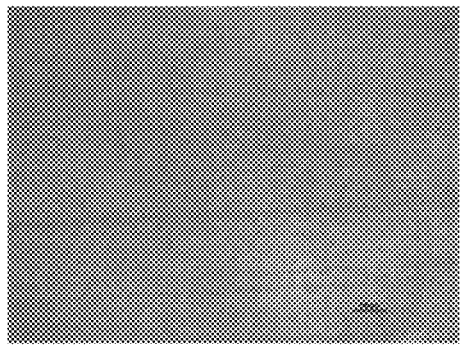
FIG. 5A    FIG. 5B
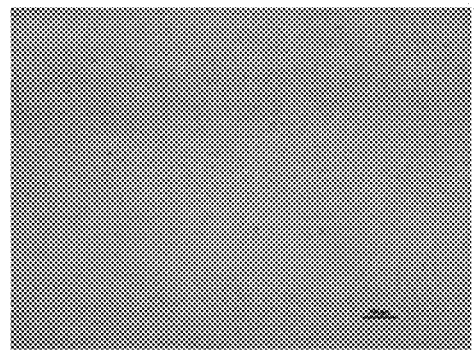
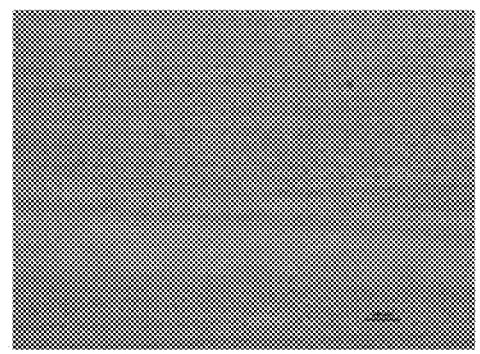
FIG. 5C    FIG. 5D
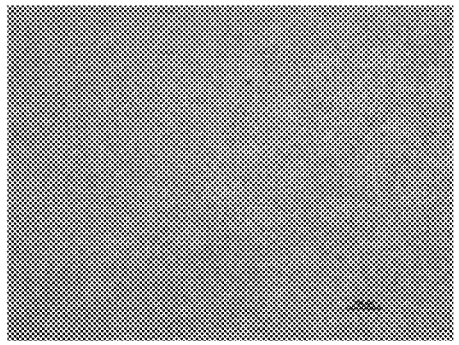
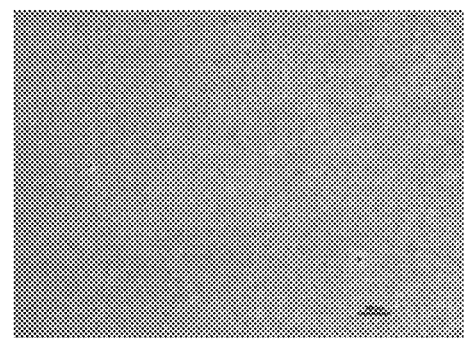
FIG. 5E    FIG. 5F

FILM-FORMING HYDROPHILIC POLYMERS FOR TRANSFIX PRINTING PROCESS

DETAILED DESCRIPTION

1. Field of the Disclosure

This disclosure relates generally to indirect inkjet printers, and in particular, to a sacrificial coating employed on an intermediate transfer member of an inkjet printer.

2. Background

In aqueous ink indirect printing, an aqueous ink is jetted onto an intermediate imaging surface, which can be in the form of a blanket. The ink is partially dried on the blanket prior to transfixing the image to a media substrate, such as a sheet of paper. To ensure excellent print quality it is desirable that the ink drops jetted onto the blanket spread and become well-coalesced prior to drying. Otherwise, the ink images appear grainy and have deletions. Lack of spreading can also cause missing or failed inkjets in the printheads to produce streaks in the ink image. Spreading of aqueous ink is facilitated by materials having a high energy surface.

However, in order to facilitate transfer of the ink image from the blanket to the media substrate after the ink is dried on the intermediate imaging surface, a blanket having a surface with a relatively low surface energy is preferred. Rather than providing the desired spreading of ink, low surface energy materials tend to promote "beading" of individual ink drops on the image receiving surface.

Thus, an optimum blanket for an indirect image transfer process must tackle both the challenges of wet image quality, including desired spreading and coalescing of the wet ink; and the image transfer of the dried ink. The first challenge—wet image quality—prefers a high surface energy blanket that causes the aqueous ink to spread and wet the surface. The second challenge—image transfer—prefers a low surface energy blanket so that the ink, once partially dried, has minimal attraction to the blanket surface and can be transferred to the media substrate.

Various approaches have been investigated to provide a solution that balances the above challenges. These approaches include blanket material selection, ink design and auxiliary fluid methods. With respect to material selection, materials that are known to provide optimum release properties include the classes of silicone, fluorosilicone, a fluoropolymer, such as TEFLON or VITON, and certain hybrid materials. These materials have low surface energy, but provide poor wetting. Alternatively, polyurethane and polyimide have been used to improve wetting, but at the cost of ink release properties. Tuning ink compositions to address these challenges has proven to be very difficult since the primary performance attribute of the ink is the performance in the print head. For instance, if the ink surface tension is too high it will not jet properly and it if is too low it will drool out of the face plate of the print head.

Additional attempts at solving the above challenges have included applying a sacrificial wetting enhancement starch coating onto the blanket to improve wetting and spread of ink while maintaining transfer capabilities. However, there are many disadvantages in using starch sacrificial wetting enhancement coatings. For example, the physical robustness of starch film is poor and contamination from starch imaging skin flaking may be encountered during post-finishing processes. Additionally, the shelf life of starch is short. That is, starch solutions from which the sacrificial coatings are made degrade quickly, such as a few days, and can only be extended to a few weeks with use of a biocide.

Identifying and developing new polymers that improve wet image quality and/or image transfer, along with having a longer shelf life than conventional solutions would be considered a welcome advance in the art.

SUMMARY

In an embodiment there is a sacrificial coating composition for an image transfer member in an aqueous ink imaging system. The coating composition can include at least one hydrophilic polymer, at least one of hygroscopic plasticizer, at least one surfactant, and water.

In another embodiment there is an indirect printing apparatus. The indirect printing apparatus can include an intermediate transfer member, a sacrificial coating on the intermediate transfer member. The sacrificial coating can include at least one hydrophilic polymer, at least one of hygroscopic plasticizer, at least one surfactant, and water. The indirect printing apparatus can also include a coating mechanism for forming the sacrificial coating onto the intermediate transfer member, a drying station for drying the sacrificial coating, at least one ink jet nozzle positioned proximate the intermediate transfer member and configured for jetting ink droplets onto the sacrificial coating formed on the intermediate transfer member, an ink processing station configured to at least partially dry the ink on the sacrificial coating formed on the intermediate transfer member, and a substrate transfer mechanism for moving a substrate into contact with the intermediate transfer member.

In yet another embodiment there is an indirect printing process. The indirect printing process can include providing an ink composition to an inkjet printing apparatus comprising an intermediate transfer member and applying a liquid coating material onto the intermediate transfer member. The liquid coating material can include at least one hydrophilic polymer, at least one of hygroscopic plasticizer, at least one surfactant, and water. The process can also include drying the liquid coating material to form a sacrificial coating and ejecting droplets of ink in an imagewise pattern onto the sacrificial coating. The process can also include at least partially drying the ink to form a substantially dry ink pattern on the intermediate transfer member, and transferring both the substantially dry ink pattern and the sacrificial coating from the intermediate transfer member to a final substrate.

The polymer coating compositions of the present disclosure can provide one or more of the following advantages: coatings having good wettability, coatings having good ink wetting and ink spreading, image transfer member coatings exhibiting improved wet image quality and/or improved image transfer with aqueous inks, improved physical robustness or increased shelf life.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIGS. 5A-5F are microscope images showing film-forming property of various coating compositions as deposited on a blanket substrates and then dried as described in the examples below.

Figure 1:
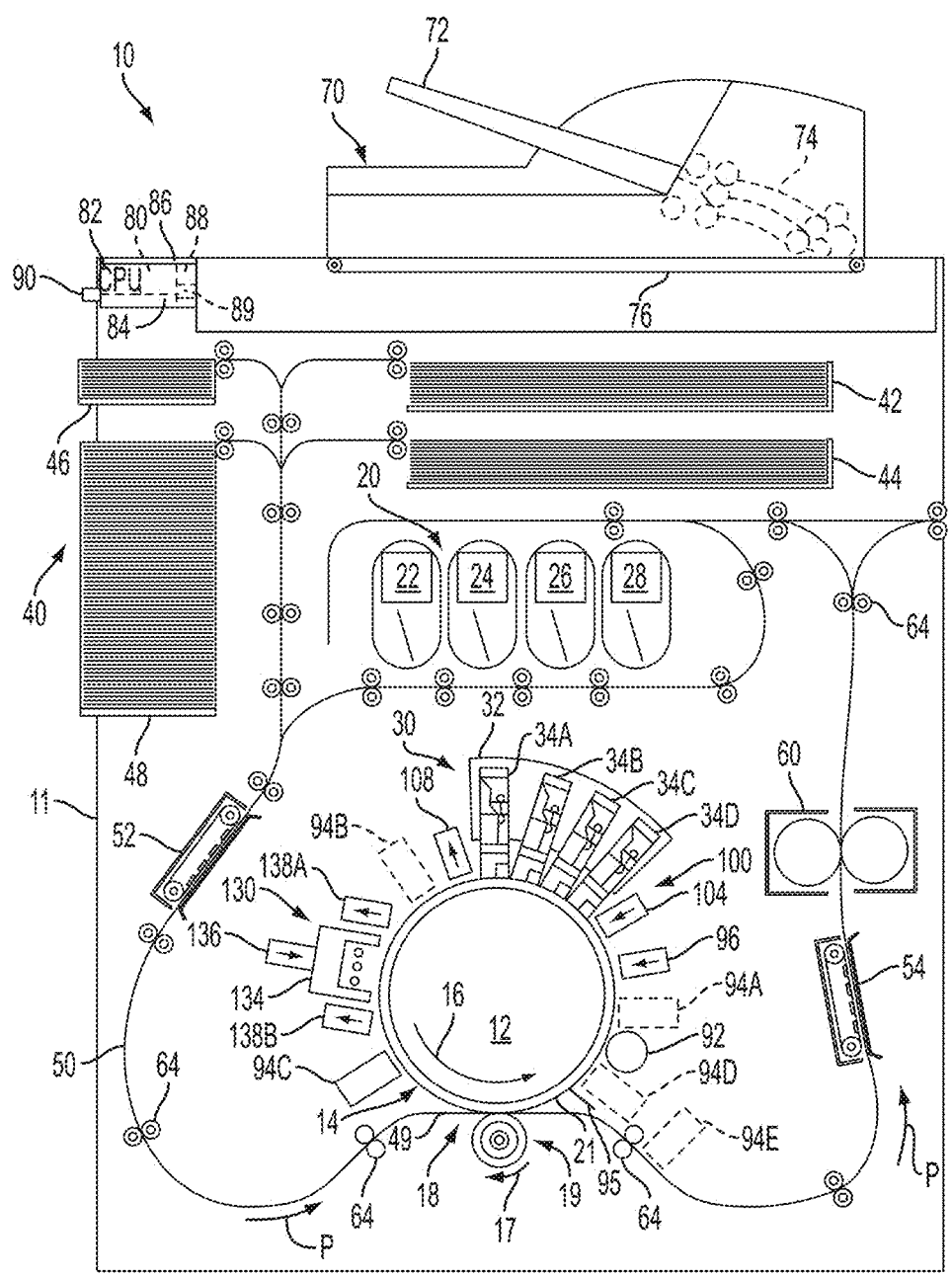
FIG. 1 is a schematic drawing of an aqueous indirect inkjet printer that prints sheet media, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

As used herein, the term "hydrophilic" refers to any composition or compound that attracts water molecules or other solvents used in aqueous ink. As used herein, a reference to a hydrophilic composition refers to a liquid carrier that carries a hydrophilic agent. Examples of liquid carriers include, but are not limited to, a liquid, such as water or alcohol, that carries a dispersion, suspension, or solution.

As used herein, a reference to a dried layer or dried coating refers to an arrangement of a hydrophilic compound after all or a substantial portion of the liquid carrier has been removed from the composition through a drying process. As described in more detail below, an indirect inkjet printer forms a layer of a hydrophilic composition on a surface of an intermediate transfer member using a liquid carrier, such as water, to apply a layer of the hydrophilic composition. The liquid carrier is used as a mechanism to convey the hydrophilic composition to an image receiving surface to form a uniform layer of the hydrophilic composition on the image receiving surface.

An embodiment of the present disclosure is directed to a hydrophilic polymer-containing sacrificial coating formed on an intermediate transfer member of an indirect printing apparatus. The sacrificial coating comprises at least one hydrophilic polymer, at least one of hygroscopic plasticizer, at least one surfactant, and water.

The at least one hydrophilic polymer can act as a binder in the compositions of the present disclosure. Examples of the at least one hydrophilic polymer include poly(vinylpyrrolidinone) (PVP), copolymers of PVP, poly(ethylene oxide), hydroxyethyl cellulose, cellulose acetate, poly(ethylene glycol), copolymers of poly(ethylene glycol), diblock copolymers of poly(ethylene glycol), triblock copolymers of poly (ethylene glycol), polyvinyl alcohol (PVOH), copolymers of PVOH, polyacrylamide (PAM), poly(N-isopropylacrylamide) (PNIPAM), poly(acrylic acid), polymethacrylate, acrylic polymers, maleic anhydride copolymers, sulfonated polyesters, and mixtures thereof.

The at least one hydrophilic polymer can have suitable weight average molecular weight from 3000 to 300,000. In an embodiment, the at least one hydrophilic polymer can provide a suitable viscosity for forming a sacrificial coating on an intermediate transfer member. For example, at about 5% by weight of the at least one hydrophilic polymer in a solution DI water, at 20° C. the viscosity can range from about 2 cps to about 800 cps, such as about 3 cps to about 500 cps, or about cps to about 100 cps, where the % by weight is relative to the total weight of the at least one hydrophilic polymer and water.

The at least one hydrophilic polymer has excellent wet film-forming and good water retention properties. The at least one hydrophilic polymer can have 100% solubility in water or hydrophilic media. As a hydrophilic polymer, the coating film formed therefrom can exhibit good water retention properties, which can assist the ink spreading on the blanket, and can have uniform film-forming properties, for example, after the liquid coating composition is semi-dried or dried on a substrate. In addition, the shelf life of the at least one hydrophilic polymer-based formulations of embodiments can be relatively long compared to some polymers, such as starches. The mechanical properties of hydrophilic polymers can be significantly better when compared to starches.

The hydrophilic polymer-containing sacrificial coating can be tailored to fine-tune the wettability and release characteristics of the sacrificial coating from the underlying ITM surface. This can be accomplished, in part, by employing one or more hygroscopic materials and one or more surfactants in the sacrificial coating composition. Any suitable hygroscopic material can be employed. The hygroscopic material can be functionalized as a plasticizer. Accordingly, as used herein, the term "hygroscopic plasticizer" refers to a hygroscopic material that has been functionalized and can be characterized as a plasticizer. In an embodiment, the at least one hygroscopic material is selected from the group consisting of glycerol/glycerin, sorbitol, xylitol, maltito, polymeric polyols such as polydextrose, glyceryl triacetate, vinyl alcohol, glycols such as propylene glycol, hexylene glycol, butylene glycol, urea, alpha-hydroxy acids (AHA's). A single hygroscopic material can be used. Alternatively, multiple hygroscopic materials, such as two, three or more hygroscopic materials, can be used.

Any suitable surfactants can be employed. Examples of suitable surfactants include anionic surfactants, cationic surfactants, non-ionic surfactants and mixtures thereof. The non-ionic surfactants can have an HLB value ranging from about 4 to about 14. A single surfactant can be used. Alternatively, multiple surfactants, such as two, three or more surfactants, can be used. For example, the mixture of a low HLB non-ionic surfactant with a value from about 4 to about 8 and a high HLB non-ionic surfactant with value from about 10 to about 14 demonstrates good wetting performance.

Initially, the sacrificial coating composition is applied to the intermediate transfer member ("ITM"), where it is semi-dried or dried to form a film, such as a sacrificial coating. The sacrificial coating can have a higher surface energy and/or be more hydrophilic than the base ITM, which is usually a material with low surface free energy, such as, for example, a polysiloxane, such as polydimethylsiloxane or other silicone rubber material, fluorosilicone, TEFLON, polyimide or combinations thereof.

In an embodiment, the sacrificial coating composition is made by mixing the ingredients comprising: at least one hydrophilic polymer, at least one hygroscopic plasticizer; at least one surfactant and water. These ingredients can be mixed in any suitable manner to form a sacrificial coating composition that can be coated onto the intermediate transfer member. In addition to the ingredients discussed above, the mixture can include other ingredients, such as solvents and biocides. Example biocides include ACTICIDES® CT, ACTICIDES® LA 1209 and ACTICIDES® MBS in any suitable concentration, such as from about 0.1 weight percent to about 2 weight percent. Examples of suitable solvents include water, isopropanol, MEK (methyl ethyl ketone) and mixtures thereof.

The ingredients can be mixed in any suitable amounts. For example, the at least one hydrophilic polymer can be added in an amount of from about 0.5 to about 30, or from about 1 to about 10, or from about 1.5 to about 5 weight percent based upon the total weight of the coating mixture. The at least one surfactant can be present in an amount of from about 0.1 to about 4, or from about 0.3 to about 2, or from about 0.5 to about 1 weight percent, based upon the total weight of the coating mixture. The at least one hygroscopic plasticizer can be present in an amount of from about 0.5 to about 30, or from about 5 to about 20, or from about 10 to about 15 weight percent, based upon the total weight of the coating mixture.

The sacrificial coating composition can be applied over the substrate by any suitable method including, but not limited to, dip coating, spray coating, spin coating, flow coating, stamp printing, die extrusion coatings, flexo and gravure coating and/or blade techniques In exemplary embodiments, an air atomization device such as an air brush or an automated air/liquid spray can be used for spray coating. In another example, a programmable dispenser can be used to apply the coating material to conduct a flow coating.

In embodiments, the sacrificial coating composition can first be applied or disposed as a wet coating on the intermediate transfer member. A drying or curing process can then be employed. In embodiments, the wet coating can be heated at an appropriate temperature for the drying and curing, depending on the material or process used. For example, the wet coating can be heated to a temperature ranging from about 30° C. to about 200° C. for about 0.01 to about 100 seconds or from about 0.1 second to about 60 seconds. In embodiments, after the drying and curing process, the sacrificial coating can have a thickness ranging from about 0.02 micrometer to about 10 micrometers, or from about 0.02 micrometer to about 5 micrometers, or from about 0.05 micrometer to about 1 micrometers.

In an embodiment, the sacrificial coating can cover a portion of a major surface of the intermediate transfer member. The major outer surface of the intermediate transfer member can comprise, for example, polysiloxane and/or a fluorinated polymer.

It has been found that the sacrificial coating overcomes the wet image quality problem discussed above by providing an ink wetting surface on the intermediate transfer member. The coatings may also improve the image cohesion significantly to enable excellent image transfer.

FIG. 1 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 because the surface 14 receives a hydrophilic composition and the aqueous ink images that are transfixed to print media during a printing process.

A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an intermediate transfer member, which is illustrated as rotating imaging drum 12 in FIG. 1, but can also be configured as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a print medium 49. In some embodiments, a heater in the drum 12 (not shown) or in another location of the printer heats the image receiving surface 14 on the blanket 21 to a temperature in a range of, for example, approximately 50° C. to approximately 70° C. The elevated temperature promotes partial drying of the liquid carrier that is used to deposit the hydrophilic composition and of the water in the aqueous ink drops that are deposited on the image receiving surface 14.

The blanket is formed of a material having a relatively low surface energy to facilitate transfer of the ink image from the surface of the blanket 21 to the print medium 49 in the nip 18. Such materials include polysiloxanes, fluoro-silicones, fluoropolymers such as VITON or TEFLON and the like. A surface maintenance unit (SMU) 92 removes residual ink left on the surface of the blanket 21 after the ink images are transferred to the print medium 49. The low energy surface of the blanket does not aid in the formation of good quality ink images because such surfaces do not spread ink drops as well as high energy surfaces.

Figure 2:
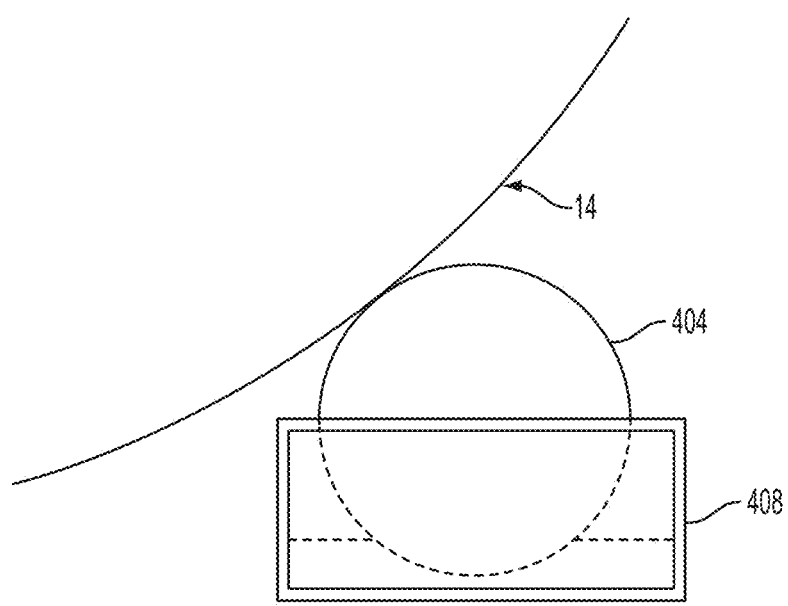
FIG. 2 is a schematic drawing of a surface maintenance unit that applies a hydrophilic composition to a surface of an intermediate transfer member in an inkjet printer, according to an embodiment of the present disclosure.

In an embodiment more clearly depicted in FIG. 2, the SMU 92 includes a coating applicator, such as a donor roller 404, which is partially submerged in a reservoir 408 that holds a sacrificial coating composition. The donor roller 404 rotates in response to the movement of the image receiving surface 14 in the process direction. The donor roller 404 draws the liquid sacrificial coating composition from the reservoir 408 and deposits a layer of the composition on the image receiving surface 14. As described below, the sacrificial coating composition is deposited as a uniform layer having any desired thickness. Examples include thicknesses ranging from about 0.1 μm to about 10 μm. The SMU 92 deposits the sacrificial coating composition on the image receiving surface 14. After a drying process, the dried sacrificial coating substantially covers the image receiving surface 14 before the printer ejects ink drops during a print process. In some illustrative embodiments, the donor roller 404 is an anilox roller or an elastomeric roller made of a material, such as rubber. The SMU 92 can be operatively connected to a controller 80, described in more detail below, to enable the controller to operate the donor roller, as well as a metering blade and a cleaning blade, selectively to deposit and distribute the sacrificial coating material onto the surface of the blanket and to remove un-transferred ink and any sacrificial coating residue from the surface of the blanket 21.

Referring back to FIG. 1, the printer 10 includes a dryer 96 that emits heat and optionally directs an air flow toward the sacrificial coating composition that is applied to the image receiving surface 14. The dryer 96 facilitates the evaporation of at least a portion of the liquid carrier from the sacrificial coating composition to leave a dried layer on the image receiving surface 14 before the intermediate transfer member passes the printhead modules 34A-34D to receive the aqueous printed image.

The printer 10 can include an optical sensor 94A, also known as an image-on-drum ("IOD") sensor, which is configured to detect light reflected from the blanket surface 14 and the sacrificial coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the sacrificial coating. The optical sensor 94A generates a series of rows of image data, which are referred to as "scanlines," as the intermediate transfer member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A can be analyzed by the controller 80 or other processor in the printer 10 to identify the thickness of the sacrificial coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes, for example, four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or solvent in the ink. The heated air source 136 directs heated air over the ink to supplement the evaporation of the water or solvent from the ink. In one embodiment, the dryer 136 is a heated air source with the same design as the dryer 96. While the dryer 96 is positioned along the process direction to dry the hydrophilic composition, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a print medium supply and handling system 40 that stores, for example, one or more stacks of paper print mediums of various sizes. The print medium supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut print mediums 49, for example. The print medium supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the intermediate transfer member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 1 is described as having a blanket 21 mounted about an intermediate rotating member 12, other configurations of an image receiving surface can be used. For example, the intermediate rotating member can have a surface integrated into its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and sacrificial coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the print medium 49 in the process direction P to a position adjacent the transfix roller 19 and then through the transfix nip 18 between the transfix roller 19 and the blanket 21. The transfix roller 19 applies pressure against the back side of the print medium 49 in order to press the front side of the print medium 49 against the blanket 21 and the intermediate transfer member 12. Although the transfix roller 19 can also be heated, in the exemplary embodiment of FIG. 1, the transfix roller 19 is unheated. Instead, the pre-heater assembly 52 for the print medium 49 is provided in the media path leading to the nip. The pre-conditioner assembly 52 conditions the print medium 49 to a predetermined temperature that aids in the transferring of the image to the media, thus simplifying the design of the transfix roller. The pressure produced by the transfix roller 19 on the back side of the heated print medium 49 facilitates the transfixing (transfer and fusing) of the image from the intermediate transfer member 12 onto the print medium 49. The rotation or rolling of both the intermediate transfer member 12 and transfix roller 19 not only transfixes the images onto the print medium 49, but also assists in transporting the print medium 49 through the nip. The intermediate transfer member 12 continues to rotate to enable the printing process to be repeated.

After the intermediate transfer member moves through the transfix nip 18, the image receiving surface passes a cleaning unit that removes residual portions of the sacrificial coating and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 1, another embodiment has a cleaning unit that includes a roller or other member that applies a mixture of water and detergent to remove residual materials from the image receiving surface 14 after the intermediate transfer member moves through the transfix nip 18. As used herein, the term "detergent" or cleaning agent refers to any surfactant, solvent, or other chemical compound that is suitable for removing any sacrificial coating and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface. In an embodiment, no residue of the sacrificial coating layer remains on the ITM after transferring the ink and sacrificial layer, in which case cleaning of the ITM to remove residual sacrificial coating may not be an issue.

Figure 3:
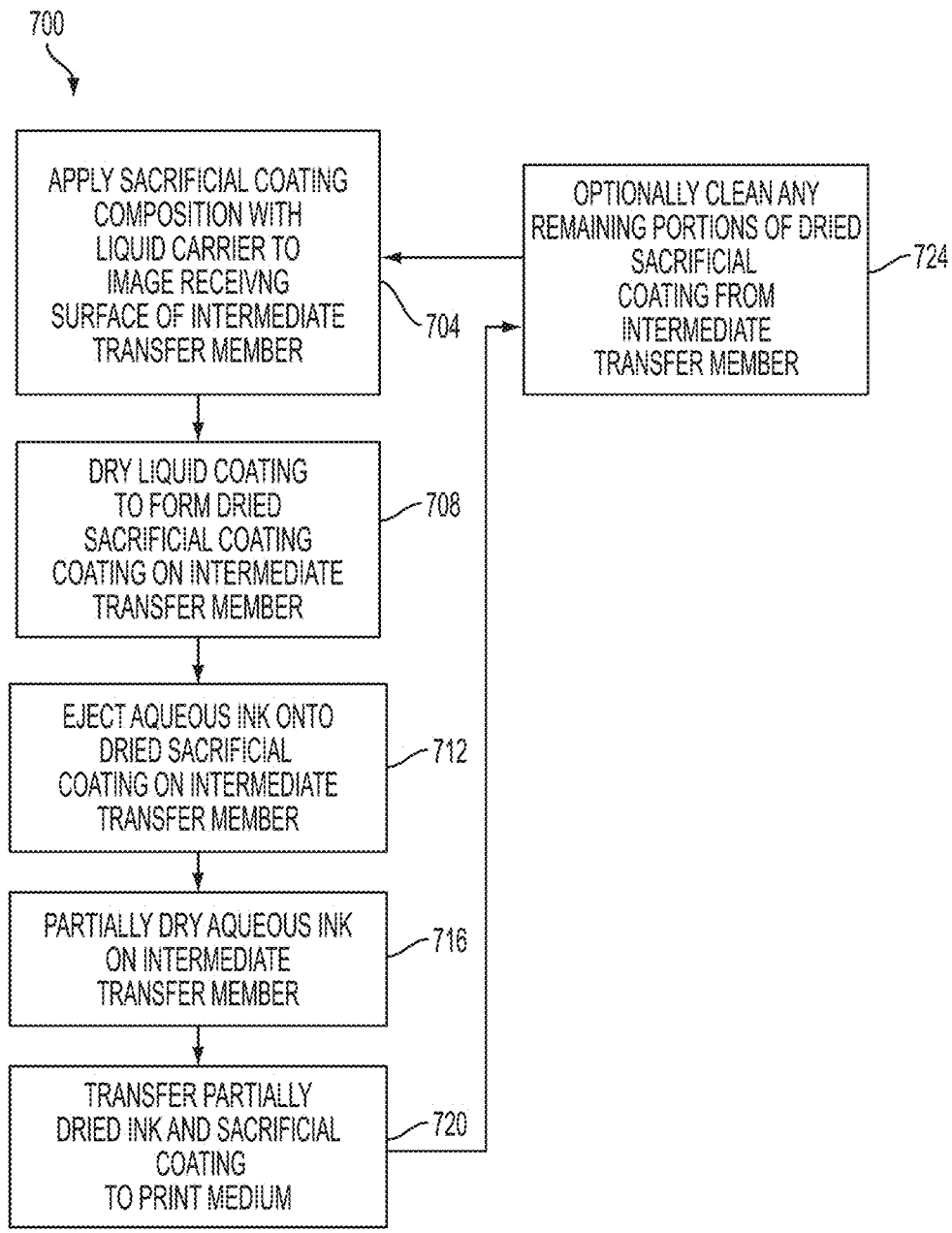
FIG. 3 is a block diagram of a process for printed images in an indirect inkjet printer that uses aqueous inks, according to an embodiment of the present disclosure.

FIG. 3 depicts a process 700 for operating an aqueous indirect inkjet printer using a sacrificial coating composition comprising polyvinyl alcohol or copolymers thereof, as described herein, to form a dried coating on an image receiving surface of an intermediate transfer member prior to ejecting liquid ink drops onto the dried layer. In the discussion below, a reference to the process 700 performing an action or function refers to a controller, such as the controller 80 in the printer 10, executing stored programmed instructions to perform the action or function in conjunction with other components of the printer. The process 700 is described in conjunction with FIG. 1 showing the printer 10, and FIG. 4A-FIG. 4E showing the blanket and coatings, for illustrative purposes. The sacrificial coatings and processes of employing these coatings are not limited to use with printer 10, but can potentially be employed with any inkjet printer comprising an intermediate transfer member, as would be readily understood by one of ordinary skill in the art.

Process 700 begins as the printer applies a layer of a sacrificial coating composition with a liquid carrier to the image receiving surface of the intermediate transfer member (block 704). In the printer 10, the drum 12 and blanket 21 move in the process direction along the indicated circular direction 16 during the process 700 to receive the sacrificial coating composition.

Figure 4A:
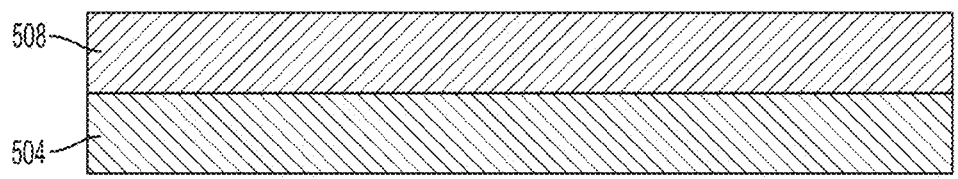
FIG. 4A is a side view of a hydrophilic composition that is formed on the surface of an intermediate transfer member in an inkjet printer, according to an embodiment of the present disclosure.

In an embodiment, the liquid carrier is water or another liquid, such as alcohol, which partially evaporates from the image receiving surface and leaves a dried layer on the image receiving surface. In FIG. 4A, the surface of the intermediate transfer member 504 is covered with the sacrificial coating composition 508. The SMU 92 deposits the sacrificial coating composition on the image receiving surface 14 of the blanket 21 to form a uniform hydrophilic coating. A greater coating thickness of the sacrificial coating composition enables formation of a uniform layer that completely covers the image receiving surface, but the increased volume of liquid carrier in the thicker coating requires additional drying time or larger dryers to remove the liquid carrier to form a dried layer. Thinner coatings of the sacrificial coating composition require the removal of a smaller volume of the liquid carrier to form the dried layer, but if the sacrificial coating is too thin, then the coating may not fully cover the image receiving surface. In certain embodiments the sacrificial coating composition with the liquid carrier is applied at a thickness of between approximately 1 µm and 10 µm.

Figure 4B:
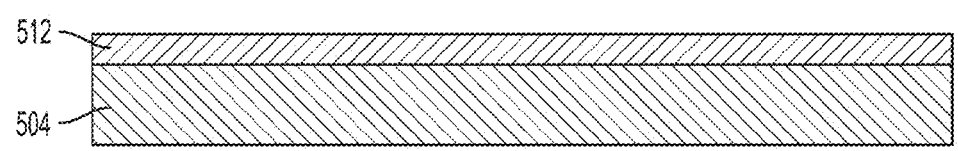
FIG. 4B is a side view of dried hydrophilic composition on the surface of the intermediate transfer member after a dryer removes a portion of a liquid carrier in the hydrophilic composition, according to an embodiment of the present disclosure.

Process 700 continues as a dryer in the printer dries the sacrificial coating composition to remove at least a portion of the liquid carrier and to form a dried layer on the image receiving surface (block 708). In the printer 10 the dryer 96 applies radiant heat and optionally includes a fan to circulate air onto the image receiving surface of the drum 12 or belt 13. FIG. 4B depicts the dried layer 512. The dryer 96 removes a portion of the liquid carrier, which decreases the thickness of the dried layer that is formed on the image receiving surface. In the printer 10 the thickness of the dried layer 512 can be any suitable desired thickness. Example thicknesses range from about 0.1 µm to about 3 µm in different embodiments, and in certain specific embodiments from about 0.1 to about 0.5 µm The dried sacrificial coating 512 is also referred to as a "skin" layer. The dried sacrificial coating 512 has a uniform thickness that covers substantially all of the portion of the image receiving surface that receives aqueous ink during a printing process. As described above, while the sacrificial coating with the liquid carrier includes solutions, suspension, or dispersion of the sacrificial coating material in a liquid carrier, the dried sacrificial coating 512 covers the image receiving surface of intermediate transfer member 504. The dried sacrificial coating 512 has a comparatively high level of adhesion to the image receiving surface of intermediate transfer member 504, and a comparatively low level of adhesion to a print medium that contacts the dried layer 512. As described in more detail below, when aqueous ink drops are ejected onto portions of the dried layer 512, a portion of the water and other solvents in the aqueous ink permeates the dried layer 512.

Process 700 continues as the image receiving surface with the hydrophilic skin layer moves past one or more printheads that eject aqueous ink drops onto the dried layer and the image receiving surface to form a latent aqueous printed image (block 712). The printhead modules 34A-34D in the printer 10 eject ink drops in the CMYK colors to form the printed image.

The sacrificial coating 512 is substantially impermeable to the colorants in the ink 524, and the colorants remain on the surface of the dried layer 512 where the aqueous ink spreads. The spread of the liquid ink enables neighboring aqueous ink drops to merge together on the image receiving surface instead of beading into individual droplets as occurs in traditional low-surface energy image receiving surfaces.

Referring again to FIG. 3, the process 700 continues with a partial drying process of the aqueous ink on the intermediate transfer member (block 716). The drying process removes a portion of the water from the aqueous ink and the sacrificial coating, also referred to as the skin layer, on the intermediate transfer member so that the amount of water that is transferred to a print medium in the printer does not produce cockling or other deformations of the print medium. In the printer 10, the heated air source 136 directs heated air toward the image receiving surface 14 to dry the printed aqueous ink image. In some embodiments, the intermediate transfer member and blanket are heated to an elevated temperature to promote evaporation of liquid from the ink. For example, in the printer 10, the imaging drum 12 and blanket 21 are heated to a temperature of 50° C. to 70° C. to enable partial drying of the ink in the dried layer during the printing process. As depicted in FIG. 4D, the drying process forms a partially dried aqueous ink 532 that retains a reduced amount of water compared to the freshly printed aqueous ink image of FIG. 4C.

The drying process increases the viscosity of the aqueous ink, which changes the consistency of the aqueous ink from a low-viscosity liquid to a higher viscosity tacky material. The drying process also reduces the thickness of the ink 532. In an embodiment, the drying process removes sufficient water so that the ink contains less that 5% water or other solvent by weight, such as less than 2% water, or even less than 1% water or other solvent, by weight of the ink.

Process 700 continues as the printer transfixes the latent aqueous ink image from the image receiving surface to a print medium, such as a sheet of paper (block 720). In the printer 10, the image receiving surface 14 of the drum 12 engages the transfix roller 19 to form a nip 18. A print medium, such as a sheet of paper, moves through the nip between the drum 12 and the transfix roller 19. The pressure in the nip transfers the latent aqueous ink image and a portion of the dried layer to the print medium. After passing through the transfix nip 18, the print medium carries the printed aqueous ink image. As depicted in FIG. 4E, a print medium 536 carries a printed aqueous ink image 532 with the sacrificial coating 512 covering the ink image 532 on the surface of the print medium 536. The sacrificial coating 512 provides protection to the aqueous ink image from scratches or other physical damage while the aqueous ink image 532 dries on the print medium 536.

During process 700, the printer cleans any residual portions of the sacrificial coating 512 that may remain on the image receiving surface after the transfixing operation (block 724). In one embodiment, a fluid cleaning system 395 uses, for example, a combination of water and a detergent with mechanical agitation on the image receiving surface to remove the residual portions of the sacrificial coating 512 from the surface of the belt 13. In the printer 10, a cleaning blade 95, which can be used in conjunction with water, engages the blanket 21 to remove any residual sacrificial coating 512 from the image receiving surface 14. The cleaning blade 95 is, for example, a polymer blade that wipes residual portions of the sacrificial coating 512 from the blanket 21.

During a printing operation, process 700 returns to the processing described above with reference to block 704 to apply the hydrophilic composition to the image receiving surface, print additional aqueous ink images, and transfix the aqueous ink images to print media for additional printed pages in the print process. The illustrative embodiment of the printer 10 operates in a "single pass" mode that forms the dried layer, prints the aqueous ink image and transfixes the aqueous ink image to a print medium in a single rotation or circuit of the intermediate transfer member. In alternative embodiments, an inkjet employs a multi-pass configuration where the image receiving surface completes two or more rotations or circuits to form the dried layer and receive the aqueous ink image prior to transfixing the printed image to the print medium.

Figure 4C:
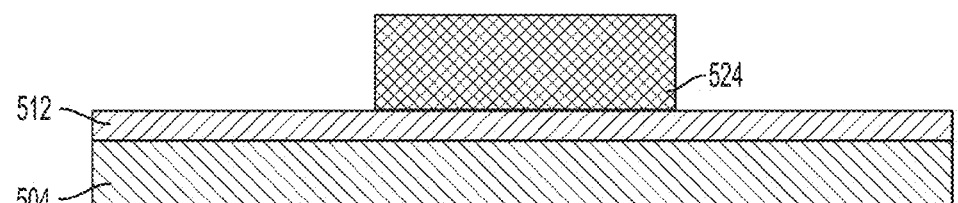
FIG. 4C is a side view of a portion of an aqueous ink image that is formed on the dried hydrophilic composition on the surface of the intermediate transfer member, according to an embodiment of the present disclosure.
Figure 4D:
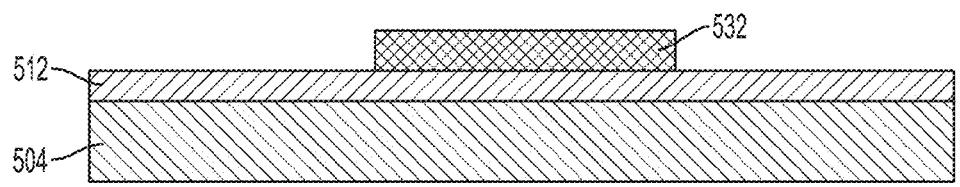
FIG. 4D is a side view of a portion of the aqueous ink image that is formed on the dried hydrophilic composition after a dryer in the printer removes a portion of the water in the aqueous ink, according to an embodiment of the present disclosure.
Figure 4E:
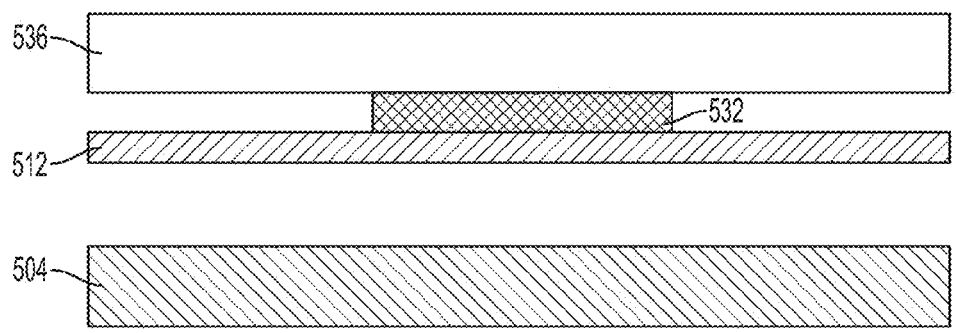
FIG. 4E is a side view of a print medium that receives the aqueous ink image and a portion of the dried layer of the hydrophilic composition after a transfix operation in the inkjet printer, according to an embodiment of the present disclosure.

In some embodiments of the process 700, the printer forms printed images using a single layer of ink such as the ink that is depicted in FIG. 4C. In the printer 10, however, the multiple printhead modules enable the printer to form printed images with multiple colors of ink. In other embodiments of the process 700, the printer forms images using multiple ink colors. In some regions of the printed image, multiple colors of ink may overlap in the same area on the image receiving surface, forming multiple ink layers on the hydrophilic composition layer. The method steps in FIG. 3 can be applied to the multiple ink layer circumstance with similar results.

EXAMPLES

Example 1

Hydrophilic Polymers and Copolymers Selection

Various hydrophilic polymers or copolymers suitable for sacrificial coating application were selected.

Low molecular weight grades of hydrophilic polymers or copolymers were preferred and selected.

TABLE 1

Hydrophilic polymers or copolymers suitable for sacrificial coating application:

| Sample # | Polymer Description | Supplier | Molecular Weight (Mw) | Brookfield Viscosity (60 RPM) |
|---|---|---|---|---|
| 1 | Polyvinylpyrrolidone (PVP; Mw = 4k-6k) | Sigma-Aldrich | 4,000 | 3-10 (5% Solution) |
| 2 | Polyvinylpyrrolidone (PVP; Mw = 29k) | Sigma-Aldrich | 29,000 | 10-30 (5% Solution) |
| 3 | Polyvinylpyrrolidone (PVP; Mw = 40k) | Sigma-Aldrich | 40,000 | 30-50 (5% Solution) |
| 4 | Poly(ethylene oxide) POLYOX WSR-N10 | Dow Chemical | 10,000 | 12-50 (5% Solution) |
| 5 | Poly(ethylene oxide) POLYOX WSR-N80 | Dow Chemical | 20,000 | 65-115 (5% Solution) |
| 6 | Poly(ethylene oxide) POLYOX WSR-N750 | Dow Chemical | 30,000 | 600-1000 (5% Solution) |
| 7 | Cellosize ™ Hydroxyethyl Cellulose WP-09H | Dow Chemical | n/a | 113-150 (5% Solution) |

TABLE 1-continued

Hydrophilic polymers or copolymers suitable for sacrificial coating application:

| Sample # | Polymer Description | Supplier | Molecular Weight (Mw) | Brookfield Viscosity (60 RPM) |
|---|---|---|---|---|
| 8 | Cellosize ™ Hydroxyethyl Cellulose WP-09L | Dow Chemical | n/a | 75-112 (5% Solution) |
| 9 | Cellosize ™ Hydroxyethyl Cellulose EP-09 | Dow Chemical | n/a | 90-160 (5% Solution) |
| 10 | METHOCEL A 15 PREM LV (Methylcellulose) | Dow Chemical | n/a | 10-50 (2% Solution) |
| 11 | METHOCEL A 4C (Methylcellulose) | Dow Chemical | n/a | n/a |
| 12 | Polyacrylamide | Sigma-Aldrich | 10,000 | n/a |
| 13 | Poly(ethylene glycol) | Polysciences Inc. | 10,000-20,000 | 10-30 |
| 15 | Polyvinyl Alcohol | SEKISUI | n/a | 3-50 (5% Solution) |
| 16 | Cellulose Acetate | Celanese | 10,000 | n/a |

Example 2

Hydrophilic Polymer or Copolymer Solution Preparation

2% to 50% solid content solutions were prepared using DI water. Polymer powder, such as that of one to three polymers selected from the listing in Table 1, were added into cold water while keeping stirred to avoid the formation of lumps. Of the above polymers, polyvinylpyrrolidone, poly(ethylene oxide), hydroxyethyl cellulose and methylcellulose as well as polyacrylamide polymers can be totally dissolved in cold water but some others may require being heated at temperature in a range from 85° C. to 98° C. to be totally dissolved. Depending on the grade of material and efficiency of the agitation system, this preparation can take from minutes to hours to ensure complete polymer dissolution into water. 50% weight percent of Polyvinylpyrrolidone; 3% weight percent of Poly(ethylene oxide) and hydroxyethyl cellulose; 2% weight percent of methylcellulose and polyacrylamides were prepared.

Example 3

Sacrificial Coating Composition

Example 3A

Example 3A-1

A Sacrificial Coating Solution was Prepared by combining and mixing 3 g 50% Polyvinylpyrrolidone (weight average molecular weight 4,000-6,000) solution and 5 g glycerol into 91 g deionized water. Next, 1 g Tergitol TMN-6 was added into the mixture to make 100 g of solution.

Example 3A-2

A sacrificial coating solution was prepared by combining and mixing 3 g 50% Polyvinylpyrrolidone (weight average molecular weight 29,000) solution and 5 g glycerol into 91 g deionized water. Next, 1 g Tergitol TMN-6 was added into the mixture to make 100 g of solution.

Example 3A-3

A sacrificial coating solution was prepared by combining and mixing 3 g 50% Polyvinylpyrrolidone (weight average molecular weight 40,000) solution and 5 g glycerol into 91 g deionized water. Next, 1 g Tergitol TMN-6 was added into the mixture to make 100 g of solution.

Example 3A-4

A sacrificial coating solution was prepared by combining and mixing 50 g 3% POLYOX WSR-N80 solution and 5 g glycerol into 44 g deionized water. Next, 1 g Tergitol TMN-6 was added into the mixture to make 100 g of solution.

Example 3A-5

A sacrificial coating solution was prepared by combining and mixing 50 g 3% POLYOX WSR-N750 solution and 5 g glycerol into 44 g deionized water. Next, 1 g Tergitol TMN-6 was added into the mixture to make 100 g of solution.

Example 3A-6

A sacrificial coating solution was prepared by combining and mixing 50 g 3% Cellosize Hydroxyethyl Cellulose WP-09H solution and 5 g glycerol into 44 g deionized water. Next, 1 g Tergitol TMN-6 was added into the mixture to make 100 g of solution.

Example 3A-7

A sacrificial coating solution was prepared by combining and mixing 75 g 2% Methocel A4C solution and 5 g glycerol. Next add 19 g deionized water and 1 g Tergitol TMN-6 into the mixture to make 100 g of solution.

Example 3A-8

A sacrificial coating solution was prepared by combining and mixing 75 g 2% Methocel A15 PREM LV solution and 5 g glycerol. Next add 19 g deionized water and 1 g Tergitol TMN-6 into the mixture to make 100 g of solution.

Example 3B

Example 3B-1

A sacrificial coating solution was prepared by combining and mixing 3 g 50% Polyvinylpyrrolidone (weight average molecular weight 4,000-6,000) solution and 2.5 g sorbitol into 93.5 g deionized water. Next, 1 g Tergitol TMN-6 was added into the mixture to make 100 g of solution.

Example 3B-2

A sacrificial coating solution was prepared by combining and mixing 3 g 50% Polyvinylpyrrolidone (weight average molecular weight 29,000) solution and 2.5 g sorbitol into 93.5 g deionized water. Next, 1 g Tergitol TMN-6 was added into the mixture to make 100 g of solution.

Example 3B-3

A sacrificial coating solution was prepared by combining and mixing 3 g 50% Polyvinylpyrrolidone (weight average molecular weight 40,000) solution and 2.5 g sorbitol into 93.5 g deionized water. Next, 1 g Tergitol TMN-6 was added into the mixture to make 100 g of solution.

Example 3B-4

A sacrificial coating solution was prepared by combining and mixing 50 g 3% POLYOX WSR-N80 solution and 2.5 g sorbitol into 46.5 g deionized water. Next, 1 g Tergitol TMN-6 was added into the mixture to make 100 g of solution.

Example 3B-5

A sacrificial coating solution was prepared by combining and mixing 50 g 3% POLYOX WSR-N750 solution and 2.5 g sorbitol into 46.5 g deionized water. Next, 1 g Tergitol TMN-6 was added into the mixture to make 100 g of solution.

Example 3B-6

A sacrificial coating solution was prepared by combining and mixing 50 g 3% Cellosize Hydroxyethyl Cellulose WP-09H solution and 2.5 g sorbitol into 46.5 g deionized water. Next, 1 g Tergitol TMN-6 was added into the mixture to make 100 g of solution.

Example 3B7

2.5 g sorbitol was dissolved in 21.5 g DI water first. A sacrificial coating solution was prepared by combining and mixing 75 g 2% Methocel A4C solution and 24 g sorbitol solution. Next add 1 g Tergitol TMN-6 into the mixture to make 100 g of solution.

Example 3B-8

2.5 g sorbitol was dissolved in 21.5 g DI water first. A sacrificial coating solution was prepared by combining and mixing 75 g 2% polyacrylamide solution and 24 g sorbitol solution. Next add 1 g Tergitol TMN-6 into the mixture to make 100 g of solution.

Surface tension of the solutions were measured at around 26-27 mN/m and with pH values in a range from 3 to 8.

Example 3C

Example 3C-1

A sacrificial coating solution was prepared by combining and mixing 15 g 10% Celvol 103 PVOH solution and 5 g glycerol into 79 g deionized water. Next, 1 g Tergitol TMN-6 was added into the mixture to make 100 g of solution.

Example 3C-2

A sacrificial coating solution was prepared by combining and mixing 15 g 10% Celvol 103 PVOH solution and 2.5 g sorbitol into 81.5 g deionized water. Next, 1 g Tergitol TMN-6 was added into the mixture to make 100 g of solution.

Example 3C-3

A sacrificial coating solution was prepared by combining and mixing 15 g 10% Celvol 103 PVOH solution, 2.5 g glycerol and 2.5 g sorbitol into 79 g deionized water. Next, 1 g Tergitol TMN-6 was added into the mixture to make 100 g of solution.

Example 3C-4

A sacrificial coating solution was prepared by combining and mixing 75 g 2% Methylcellulose Methocel A15 PREM LV solution and 5 g glycerol into 19 g deionized water. Next, 1 g Tergitol TMN-6 was added into the mixture to make 100 g of solution.

Example 3C-5

A sacrificial coating solution was prepared by combining and mixing 75 g 2% Methylcellulose Methocel A15 PREM LV solution and 2.5 g sorbitol into 21.5 g deionized water. Next, 1 g Tergitol TMN-6 was added into the mixture to make 100 g of solution.

Example 3C-6

A sacrificial coating solution was prepared by combining and mixing 75 g 2% Methylcellulose Methocel A15 PREM LV solution, 2.5 g glycerol and 2.5 g sorbitol into 19 g deionized water. Next, 1 g Tergitol TMN-6 was added into the mixture to make 100 g of solution.

Example 3C-7

A sacrificial coating solution was prepared by combining and mixing 15 g 10% Celvol 103 PVOH solution and 5 g pentaerythritol into 79 g deionized water. Next, 1 g Tergitol TMN-6 was added into the mixture to make 100 g of solution.

Example 3C-8

A sacrificial coating solution was prepared by combining and mixing 15 g 10% Celvol 103 PVOH solution, 2.5 g glycerol and 2.5 g pentaerythritol into 79 g deionized water. Next, 1 g Tergitol TMN-6 was added into the mixture to make 100 g of solution.

Example 3D

Example 3D-1

A sacrificial coating solution was prepared by combining and mixing 3 g 50% Polyvinylpyrrolidone (weight average molecular weight 4,000-6,000) solution and 5 g glycerol into 91.8 g deionized water. Next, 0.15 g Tergitol 15-s-7 and 0.05 g Surfynol 420 were added into the mixture to make 100 g of solution.

Example 3D-2

A sacrificial coating solution was prepared by combining and mixing 3 g 50% Polyvinylpyrrolidone (weight average molecular weight 29,000) solution and 5 g glycerol into 91.8 g deionized water. Next, 0.15 g Tergitol 15-s-7 and 0.05 g Surfynol 440 were added into the mixture to make 100 g of solution.

Example 3D-3

A sacrificial coating solution was prepared by combining and mixing 3 g 50% Polyvinylpyrrolidone (weight average molecular weight 40,000) solution and 5 g glycerol into 91.8 g deionized water. Next, 0.15 g Tergitol 15-s-7 and 0.05 g Tergitol 15-s-9 were added into the mixture to make 100 g of solution.

Example 3D-4

A sacrificial coating solution was prepared by combining and mixing 75 g 2% Methylcellulose Methocel A15 PREM LV solution, 2.5 g glycerol and 2.5 g sorbitol into 19.8 g deionized water. Next, 0.15 g Tergitol 15-s-7 and 0.05 g Surfynol 104H were added into the mixture to make 100 g of solution.

Example 4

Coating Process

Sacrificial coating solutions of Example 3A-2 and 3B-2 were coated on blanket substrate using a Pamarco anilox roll 165Q13 by hand.

The substrate was made from fluorinated polymer G621 manufactured by Daikin Industries, Ltd. and a crosslinker, AO700. (aminoethyl aminopropyl trimethoxysilane from Gelest) The hotplate was setup at 65° C. while the substrate temperature was around 40-50° C. The wet film thickness was around 4-5 microns and the dry film thickness was around 200 to 300 nm. The coated films were dried in oven at 60° C. for 30 seconds.

Example 5

Optical Microscope Images

In order to make ink having good wetting and spreading on a sacrificial coating, it is desirable that continuous uniform film be achieved and a rainbow color be observed. The optical microscope images were taken on the film which was coated on G621 blanket substrate.

Example 5A

A sample like that of sample 3A-2 of Example 3A and a sample like that of sample 3B-2 of Example 3B were prepared using the same polyvinylpyrrolidone but different hygroscopic plasticizer. That is, a sample like that of sample 3A-2 was loaded with 5% glycerol and a film form therefrom as shown in FIG. 5A. As shown in FIG. 5A, this sample did not form a continuous uniform film. A sample like that of sample 3B-2 was loaded with 5% sorbitol and a film form therefrom as shown in FIG. 5B. As shown in FIG. 5B, the film has a uniform surface.

Example 5B

Samples like those of sample 3A-6 of Example 3A and sample 3B-6 were prepared using the same poly(ethylene oxide) but different hygroscopic plasticizer. That is, the sample like that of sample 3A-6 was loaded with 5% glycerol and a film was formed therefrom as shown in FIG. 5C. As shown in FIG. 5C, this sample with glycerol formed a better uniform surface as compared to, for example, FIG. 5C. The sample like that of sample 3B-6 was loaded with 5% sorbitol and a film form therefrom as shown in FIG. 5D. As shown in FIG. 5D, the film has a uniform surface.

Example 5C

Samples like those sample 3A-6 of Example 3A and sample 3B-6 were prepared using the same hydroxyethyl cellulose but with different hygroscopic plasticizer and films were formed therefrom as shown in FIGS. 5E-5F, respectively. As shown in FIGS. 5E-5F, the surface uniformity for both formulations are very similar.

Example 6

Spreading Test—Fibro DAT1100 Contact Angle Results

The ink wettability can be characterized by the ink droplet forming on the sacrificial coating. The ink-on-coated-film contact angle and spreading were captured using Fibro DAT1100 instrument. Lab experimental ink was used for this measurement. The ink drop size was controlled at 0.5 µl. Since the lab experimental ink spreading on skin is too fast and the contact angle can't be captured on most samples, only drop images are demonstrated here.

Figure 6A:
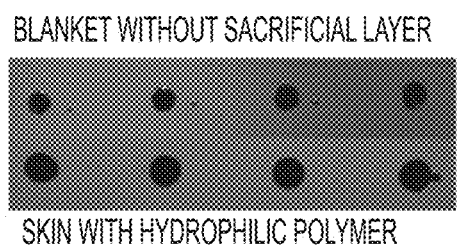
FIGS. 6A-6D show results of ink drop evaluations as described in the examples below.

FIG. 6A shows a comparison of ink droplet on blanket G621 with and without coating containing hydrophilic polymers. The larger the droplets, the better the spreading of ink; the blanket coated with formulation containing hydrophilic polymer has much larger drop diameter which means better ink spreading.

Figure 6B:
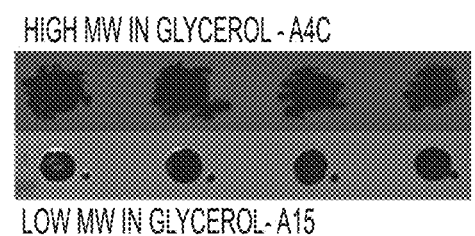

FIG. 6B shows the blanket was coated by the skin formulations containing the same hydroxyethyl cellulose (Methocel) hydrophilic polymer with the same 5% of glycerol and the same surfactant loading. The only difference is the molecular weight of the Methocel polymer. The viscosity of Methocel A15 PREM LV is 15 mPa s while Methocel A4C is 400 mPa s for a 2% solution in water at 20° C. As shown, some coating images have a large droplet but ink spreading is uncontrolled. While not limited by any particular theory it is believed that the weight average molecular weight of the hydrophilic polymer is important for controlling the spreading of ink drop.

Figure 6C:
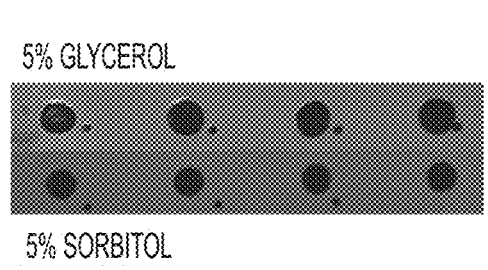

FIG. 6C shows the coating using the same hydrophilic polymer Methocel-A15 but with different hygroscopic plasticizer. For example, a sample like Sample 3A-8 of Example 3 was loaded with 1.5% dry weight percentage of Methocel A 15 PREM LV, 5% glycerol, and another sample was loaded with 5% sorbitol. With the same loading (5%) of hygroscopic plasticizer, glycerol provides better ink spreading than sorbitol. Different ink spreading shows the effect of hygroscopic plasticizer in the formulation.

Figure 6D:
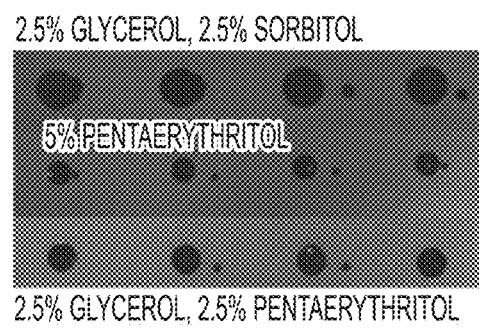

FIG. 6D shows the effect of the different hygroscopic plasticizer mixtures. With the same polyvinyl alcohol (hydrolysis of 87-89%), using the mixtures of different hygroscopic plasticizer, glycerol, sorbitol and pentaerythritol, different ink/skin interactions were obtained. Glycerol provides the best ink spreading.

Example 7

Air Brush Transfer Test

Lab experimental ink-1 and experimental ink-2 were tested by spraying on a blanket coated with formulation comprising hydrophilic polymers (samples 3A-6, 3A-7, 3A-8, 3B-5 and 3B-7 by air brush. The transfer condition was 320° F., 50 psi and 5 seconds dwell time. Prints made were transferred onto a DGEG paper substrate. The transfer condition was 210° F., 50 psi and 5 seconds dwell time. No residual ink was observed on the blanket after ink was transferred to the paper.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An indirect printing apparatus comprising:
    an intermediate transfer member;
    a sacrificial coating on the intermediate transfer member, the sacrificial coating comprising
        at least one hydrophilic polymer,
        at least one of hygroscopic plasticizer,
        at least one surfactant, and
        water;
    a coating mechanism for forming the sacrificial coating onto the intermediate transfer member;
    a drying station for drying the sacrificial coating;
    at least one ink jet nozzle positioned proximate the intermediate transfer member and configured for jetting ink droplets onto the sacrificial coating formed on the intermediate transfer member;
    an ink processing station configured to at least partially dry the ink on the sacrificial coating formed on the intermediate transfer member; and
    a substrate transfer mechanism for moving a substrate into contact with the intermediate transfer member.

2. The indirect printing apparatus of claim 1, wherein the intermediate transfer member is a blanket, and the sacrificial coating covers at least a portion of a major outer surface of the blanket.

3. The indirect printing apparatus of claim 1, wherein the at least one polymer comprises a molecular weight in the range of about 3000 to about 300,000.

4. The indirect printing apparatus of claim 1, wherein a viscosity of the at least one hydrophilic polymer in a DI water solution at 20° C. ranges from about 3 cps to about 800 cps, wherein the solution contains about 5% by weight hydrophilic polymer relative to the total weight of the at least one hydrophilic polymer and DI water in the solution.

5. The indirect printing apparatus of claim 1, wherein the at least one hydrophilic polymer is selected from the group consisting of poly(vinylpyrrolidinone) (PVP), poly(ethylene oxide), hydroxyethyl cellulose, cellulose acetate, poly(ethylene glycol), poly(ethylene glycol), copolymers of poly(ethylene glycol), diblock copolymers of poly(ethylene glycol), triblock copolymers of poly(ethylene glycol), polyvinyl alcohol (PVOH), copolymers of PVOH, polyacrylamide (PAM), poly(N-isopropylacrylamide) (PNIPAM), poly(acrylic acid), polymethacrylate, acrylic polymers, maleic anhydride copolymers, sulfonated polyesters, and mixtures thereof.

6. The indirect printing apparatus of claim 1, wherein the at least one hygroscopic plasticizer is selected from the group consisting of glycerol, sorbitol, vinyl alcohol such as ethylene vinyl alcohol, propylene glycol, hexylene glycol, butylene glycol, xylitol, maltito, polymeric polyols such as polydextrose, glyceryl triacetate, urea and alpha-hydroxy acids (AHA's).

7. The indirect printing apparatus of claim 1, wherein the at least one surfactant comprises an ionic or anionic surfactant having an HLB value ranging from about 4 to about 14.

8. An indirect printing process, comprising:
    providing an ink composition to an inkjet printing apparatus comprising an intermediate transfer member;
    applying a liquid coating material onto the intermediate transfer member, the liquid coating material comprising:
        at least one hydrophilic polymer,
        at least one of hygroscopic plasticizer,
        at least one surfactant, and
        water;
    drying the liquid coating material to form a sacrificial coating;
    ejecting droplets of ink in an imagewise pattern onto the sacrificial coating;
    at least partially drying the ink to form a substantially dry ink pattern on the intermediate transfer member; and
    transferring both the substantially dry ink pattern and the sacrificial coating from the intermediate transfer member to a final substrate.

9. The indirect printing process of claim 8, the at least one hydrophilic polymer is selected from the group consisting of poly(vinylpyrrolidinone) (PVP), copolymers of PVP, poly (ethylene oxide), hydroxyethyl cellulose, cellulose acetate, poly(ethylene glycol), poly(ethylene glycol), copolymers of poly(ethylene glycol), diblock copolymers of poly(ethylene glycol), triblock copolymers of poly(ethylene glycol), polyvinyl alcohol (PVOH), copolymers of PVOH, polyacrylamide (PAM), poly(N-isopropylacrylamide) (PNIPAM), poly (acrylic acid), polymethacrylate, acrylic polymers, maleic anhydride copolymers, sulfonated polyesters, and mixtures thereof.

* * * * *